Figure 1:
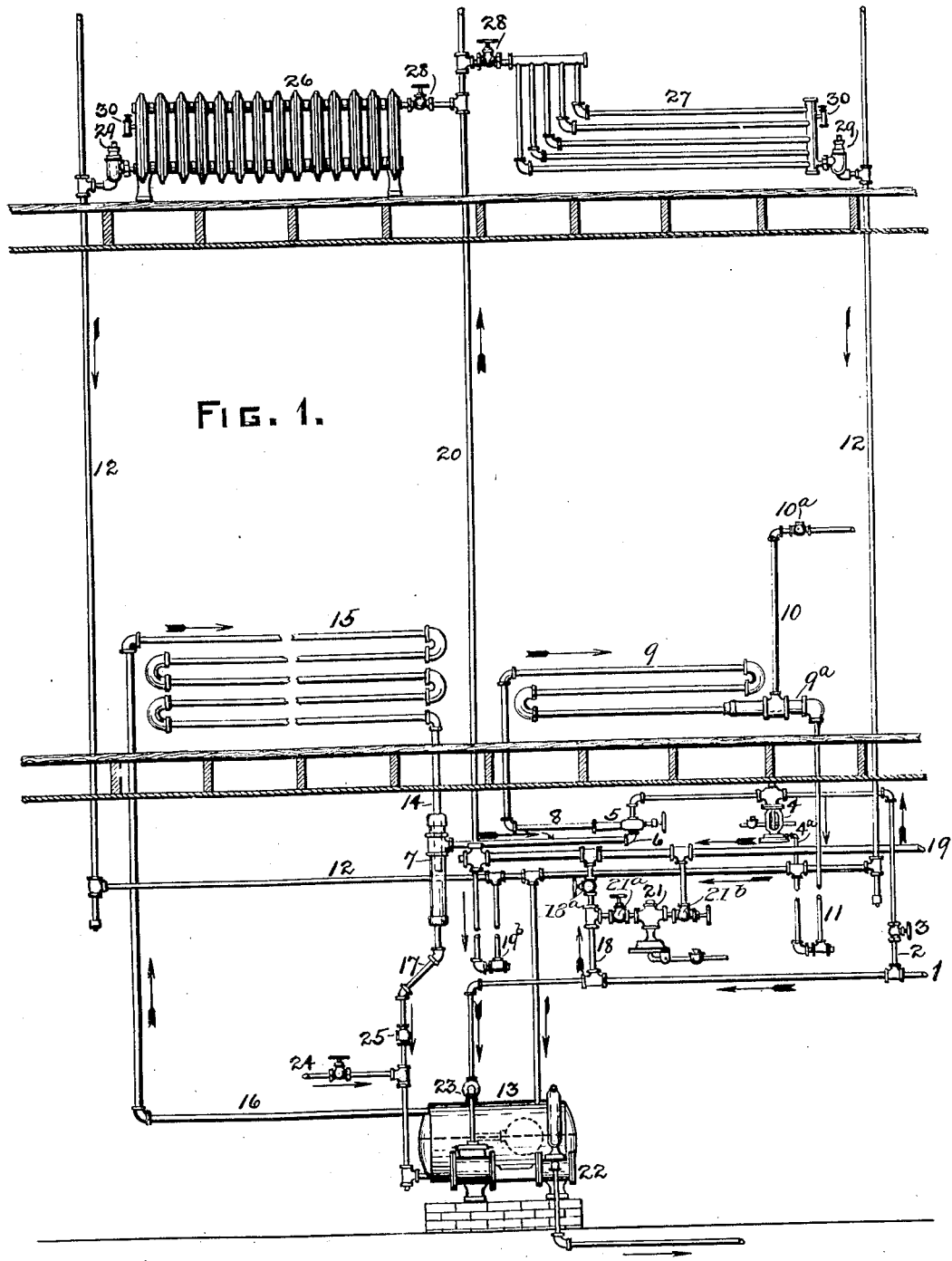

C. C. PECK.
SYSTEM OF HEATING BY AID OF VACUUM.
APPLICATION FILED JAN. 22, 1909.

927,591.

Patented July 13, 1909.
4 SHEETS—SHEET 1.

WITNESSES:

INVENTOR:
Cassius Carroll Peck

C. C. PECK.
SYSTEM OF HEATING BY AID OF VACUUM.
APPLICATION FILED JAN. 22, 1909.

927,591.

Patented July 13, 1909.
4 SHEETS—SHEET 2.

WITNESSES:
Arthur S. Light.
Clarence W. Carroll.

INVENTOR:
Cassius Carroll Peck

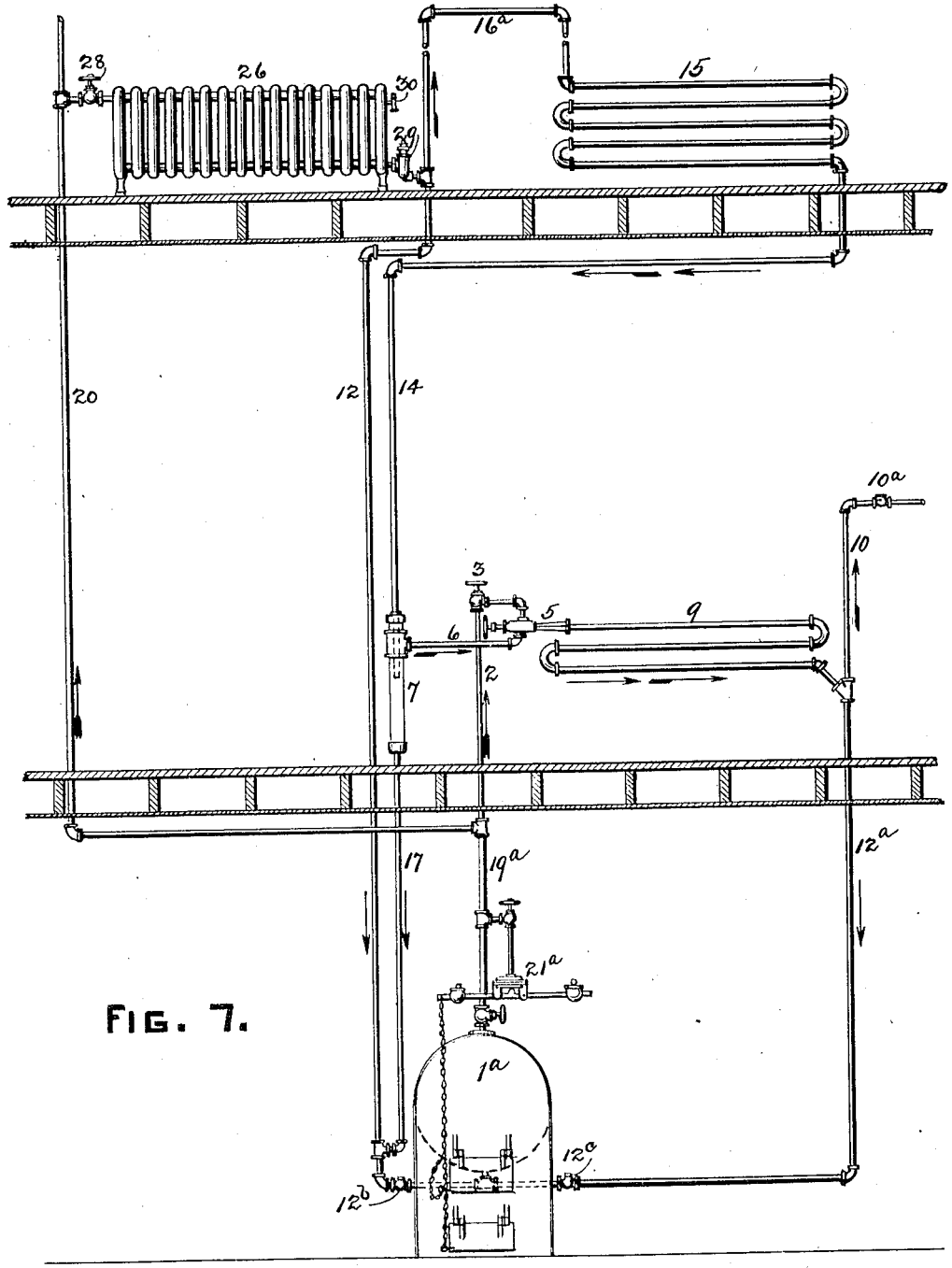

C. C. PECK.
SYSTEM OF HEATING BY AID OF VACUUM.
APPLICATION FILED JAN. 22, 1909.
927,591.
Patented July 13, 1909.
4 SHEETS—SHEET 4.
Fig. 10.
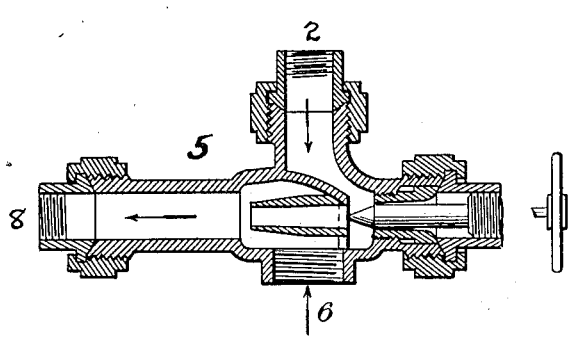
Fig. 11.
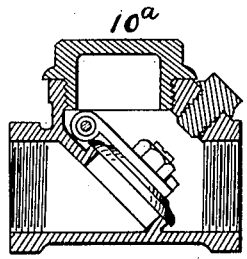
Fig. 8.
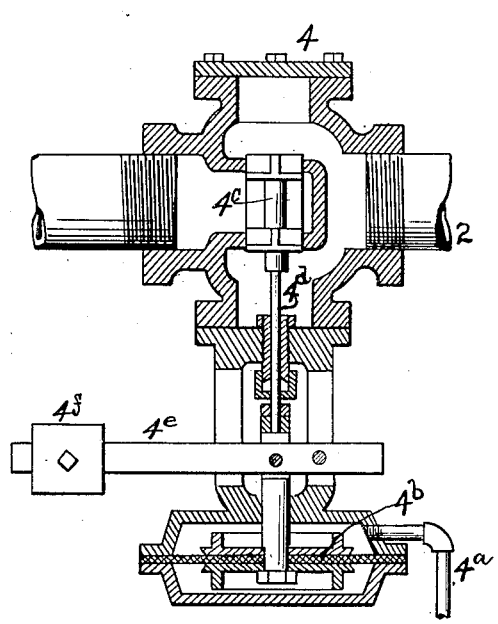
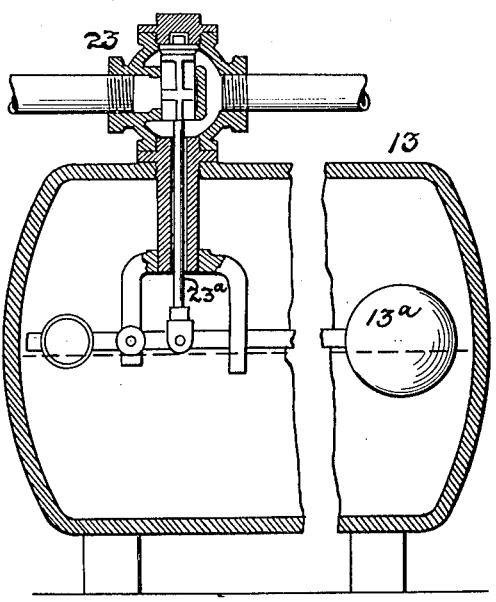
Fig. 9.
WITNESSES:
Clarence W. Carroll
William W. Whitmore
INVENTOR:
Cassius Carroll Peck

UNITED STATES PATENT OFFICE.

CASSIUS CARROLL PECK, OF ROCHESTER, NEW YORK.

SYSTEM OF HEATING BY AID OF VACUUM.

No. 927,591.  Specification of Letters Patent.  Patented July 13, 1909.

Application filed January 22, 1909. Serial No. 473,762.

*To all whom it may concern:*

Be it known that I, CASSIUS CARROLL PECK, a citizen of the United States, residing at Rochester, in the county of Monroe and State of New York, have invented a certain new and useful Improved System of Heating by Aid of Vacuum, of which the following is a specification.

My invention constitutes certain improvements in the vacuum system which is embodied in my Patents Number 874,112 and 874,113, dated December 17th, 1907, and Number 883,337, dated March 31st, 1908, and consist in an improved combination and arrangement of apparatus by means of which better operative results are secured, taken in connection with the addition of certain devices for giving more complete control of heat supply, prevention of clogging with solid matter, and making the system noiseless in operation.

Experience having shown that an automatic valve is not needful in a well designed vacuum heating system for attachment to the return end of each radiating unit, but that it is needful to guard carefully against clogging the small opening required, I have provided the most desirable conditions by combining such a screen as is shown in my Patent Number 874,112, with such a type of fixed opening valve as is described and shown in my Patent Number 874,113, and made the discharge from the valve body at the bottom of the body, so as to secure the combined advantages of these two type of valves while avoiding the use of any part which must move to effect operation. As a fixed opening valve on the return end of a radiator requires means of preventing steam from being drawn from the return pipes into radiators when the supply valve of each radiator is closed, it has been necessary to add a vacuum relief to allow air to enter each radiator when sufficient vacuum is formed therein by condensation of steam to reach the degree of vacuum which is maintained in the return pipes. While this relief can be made a part of the radiator return valve, it is better to treat it as a separate device, as my experience with both ways of use has shown, and attach it to a radiator where an ordinary air valve would be attached. This avoids the possibility of water leakage through the relief by collection of condensation at the bottom portion of a radiator.

An important improvement over the previous patents referred to consists in combining the air and water separator shown and described therein with the receiver of the water pump, thus making said receiver a separator, and connecting a steam jet exhauster to the far end of a secondary radiator placed between said receiver and said pump. By this arrangement of condensing surface the water level in the receiver is not materially affected by the degree of vacuum maintained in the return pipes of the heating circuit.

Another improved feature consists of an air-cooled surface condenser for condensing steam ejected from, and employed for operating the exhauster, together with means for returning the resulting water of condensation to the receiver, or to the boiler, as the case may be.

Figure 3:
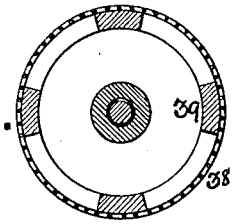
Figure 6:
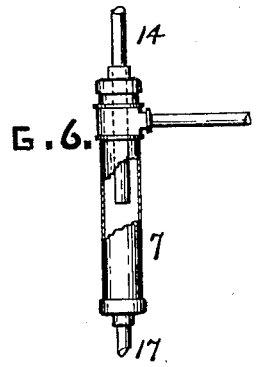
Figure 4:
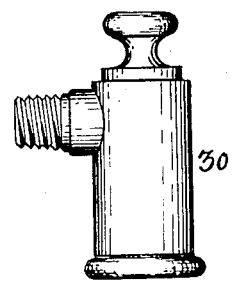
Figure 2:
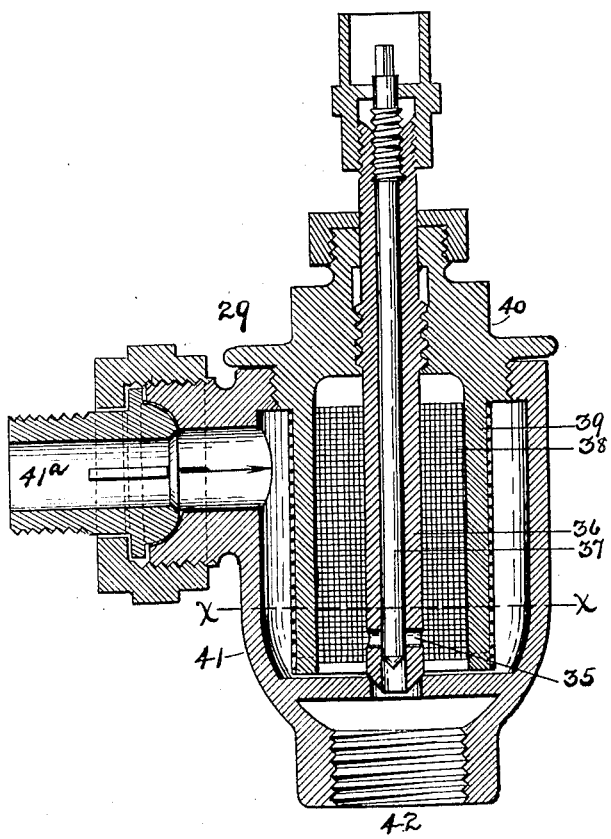
Figure 5:
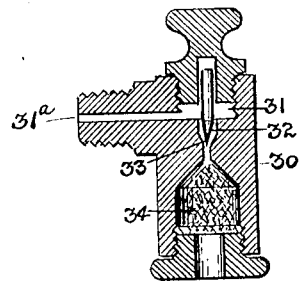

In the drawings Figure 1 is an elevation showing the elements of my improved heating system suitably assembled for operation. Fig. 2 is a central vertical section of the valve which is used on the return end of each radiating unit. Fig. 3 is a cross section of the screen frame with its screen and the valve stems of the two valves in a single valve body on plane of broken line X—X, Fig. 2. Fig. 4 is a vertical elevation of the vacuum relief device. Fig. 5 is the corresponding central vertical section of said device. Fig. 6 is an elevation of the air and water separator required on the return end of the secondary radiator for returning water of condensation formed in said radiator to the receiver, or to the boiler, a portion being broken away to show the return pipe. Fig. 7 is an elevation showing a proper arrangement of the elements of my heating system to suit a low pressure steam heating system such as is used for heating houses with say from one half pound to two and a half pounds pressure. Fig. 8 is a central vertical section of the vacuum governor, showing the steam supply valve to the exhauster controlled by a diaphragm in operative connection with the return pipe of the heating circuit. Fig. 9 is a central vertical section of an ordinary receiver and of a float-governed valve which admits operative steam to a pump which has its suction connected to the water space of the receiver. Fig. 10 is a central vertical section of a steam jet exhauster such as used on my system of heating. Fig.

11 is a central vertical section of an ordinary check valve similar to those designated in Fig. 1 as 10ª, 12ᵇ and 12ᶜ.

In Fig. 1 live steam pipe 1 supplies high pressure steam from a boiler, or other convenient source, through pipe 2, controlled by stop valve 3 and governor valve 4, to the steam jet exhauster 5, which exhausts air and vapor through suction pipe 6 from the separator 7, and discharges through pipe 8 and condensing coil 9 to the atmosphere through pipe 10, which is provided with an outwardly opening check-valve 10ª, water of condensation from the coil flowing through the U trap 11 to the main return pipe 12 of the heating circuit, and so to receiver 13. Separator 7 is connected by pipe 14 with the secondary heating and condensing coil 15, the supply pipe of which 16 is connected with the upper part of receiver 13; hence the exhauster 5 draws all air and vapor from the receiver and creates and maintains such degree of vacuum therein as is desired for the return piping of the heating system. Separator 7 is drained by gravity through pipe 17 into receiver 13. High pressure steam pipe 1 also supplies through pipe 18 such amount of steam to low pressure pipe 19 as is needed in excess of low pressure steam which is furnished from an engine exhaust, or otherwise, to said pipe 19 as is required for maintaining requisite pressure in supply pipe 20. Pressure reducing valve 21 is preferably placed in a three-valve by-pass having the valve 18ª in pipe 18 between the by-pass and pipe 19 and the valves 21ª and 21ᵇ in the by-pass on either side of reducing valve 21, as shown, to facilitate making any needed repairs. Main supply 19 is preferably drained by a U trap 19ᵇ into main return pipe 12, but if, in order to lift water of condensation, or for other cause, so high a vacuum be carried as to overbalance the height of a column of water in a U trap, a differently constructed trap must be substituted.

Receiver 13 is connected at the bottom in the usual manner to the water pump 22, which delivers water of condensation to any desired point, as into a heater, or a boiler, the pump being driven by live steam controlled by valve 23 actuated, as is usual in such apparatus, by a float shown in broken lines in the receiver, and in section in Fig. 9, for maintaining a proper water level in the receiver. Additional water supply may be provided through valved pipe 24, a check valve 25 in pipe 17 preventing such supply from reaching separator 7. This separator has pipe 14 extended well into the larger pipe so as to deliver water of condensation below the point of attachment for suction pipe 6, which insures complete separation of air and vapor from water, and is placed sufficiently high above the receiver to insure gravity drainage, as an ordinary steam trap would not discharge water of condensation from a chamber in which was a partial vacuum.

Radiator 26 and coil 27 represent the radiating units of a heating system, which system may include any number of such units. Each is provided with a supply valve 28 of any preferred pattern, and preferably with my valve 29 shown in Fig. 2, which latter constantly drains the radiator and the coil into return pipes 12. The vacuum relief 30 having a chamber 31 connected with the interior of the radiator by passage 31ª, valve pin 32 and valve seat 33 placed at the bottom of the chamber, and the muffler chamber 34, which is usually filled with fibrous material so as to prevent the whistling noise of inrushing air, is attached at any convenient point to the upper portion of each radiator. Gravity, and steam pressure transmitted from the radiator, unite in holding the valve pin to its seat and preventing outward leakage of steam; but when some degree of vacuum succeeds steam pressure in a radiator the valve pin is lifted and air enters the radiator and relieves the vacuum, that is the excess above the degree of vacuum in return pipes which would otherwise draw steam and air from return pipe 12, causing noise, accumulation of water of condensation and continued heating of the radiator. The valve passages in relief 30 are quite small, 1/16 inch diameter serving for a radiator containing fifty or more square feet of surface, and are never larger than the constantly open passage in the water discharge valve at the return end of the radiator, so that the degree of vacuum in return pipes of a heating circuit is not lessened by automatic opening of the vacuum reliefs on radiators.

As best shown in Fig. 8, automatic governor valve 4 is operated by the degree of vacuum which exists in return pipe 12 by transmission through pipe 4ª of the pressure to the diaphragm 4ᵇ to which the balanced piston steam valve 4ᶜ is attached by the stem 4ᵈ. Movement of the diaphragm is restrained within the desired limit of pressure by the lever 4ᵉ which is pivoted to said stem and has a fulcrum in form of a pin which passes through the lever and is fixed in one arm of the yoke which unites the valve case to the diaphragm case. By moving the weight 4ᶠ more or less on the lever the diaphragm is made to move the valve at the proper point to either increase or decrease the live steam supply to exhauster 5 and thus to correspondingly increase or decrease its suction from the return piping of the heating circuit and in this way maintain a fixed degree of vacuum therein. It is immaterial whether the vacuum governor pipe 4ª be connected to the diaphragm case above or below diaphragm 4ᵇ, but when connected above, as shown, an increase of vacuum will raise the diaphragm and the valve stem 4ᵃ and close valve 4ᶜ against passage of live steam, and decrease of vacuum will cause opposite movement.

The operation is as follows:—Steam of desired pressure being supplied through pipe 19 to pipe 20, and the preferred degree of vacuum established in return pipes 12 acting through openings 35 in valve stem 36, said openings being more or less closed by admitting live steam through pipe 2 and automatic governor valve 4 to exhauster 5, radiator supply valves are opened either fully or partially. As water of condensation forms in the radiator and in the coil it is constantly drained by gravity, aided by vacuum in return pipes 12, acting through openings 35 in valve stem 36, said openings being more or less closed to suit the amount of radiating surface by adjusting valve 37 by screwing it up or down as needful, the larger valve stem 36 being screwed down to its seat. The discharge from pipes 12 enters receiver 13 where air and vapor become separated from the water of condensation, the latter being automatically withdrawn from the receiver by steam pump 22 through governing steam supply for actuating the pump by the float 13ᵃ (see Fig. 9) acting through valve-stem 23ᵃ of valve 23 to admit and cut off steam in pipe 1 which operates the pump. Water is thus discharged as fast as it accumulates to the desired level while air and steam flow through pipe 16 to the secondary radiator 15, which normally has sufficient surface for condensing all steam which enters it, the water of condensation then flowing through pipe 14 into separator 7, thence sinking by gravity through pipe 17 into receiver 13. All air and vapor are withdrawn through suction pipe 6 by exhauster 5 and forced through coil 9 into the enlarged section of piping 9ᵃ, which constitutes a separating chamber for air and water, whence air escapes freely to the atmosphere through pipe 10 having the outwardly opening check-valve 10ᵃ to prevent return of air therethrough, while any water of condensation formed in said coil returns by gravity through the U shaped trap 11 into the main return pipe 12.

As but a slight suction in the return pipes from the radiators is required for removing the air and the water from the latter, only a low degree of vacuum should be maintained for this purpose, and maintaining more vacuum than is necessary is attended with increasing difficulty in keeping piping tight against inward leakage of air as well as useless expenditure of power in creating the higher degree of vacuum, besides increasing the volume of vapor by expanding it in the return pipes. Furthermore it becomes impossible to easily regulate the extent to which radiators can be kept filled with steam so as to control the amount of heat given out by radiators. It is one of the main objects of the present improvements to provide for easy operation of the heating circuit with lowest practicable pressure of steam supply and lowest permissible degree of vaccum in the return pipes. To this end sufficient opening is given through the smaller passage in valve 29 to insure complete drainage at all times of water and air and to allow escape of some steam, the secondary radiator 15 being proportioned to condense the amount of steam which should be allowed to escape through the valve passages and is here shown in form of a coil as being best adapted for compelling all steam entering the coil to flow over all of the cooling surface before reaching the return end of the coil. This secondary radiator is utilized the same as a primary radiator, that is as either a direct radiator or as an indirect radiator; at the same time it prevents all waste of water and of heat contained by the water from the heating system; which matter of waste is of considerable importance in other vacuum systems that necessarily employ fresh water for condensing steam in return pipes to prevent the steam from reaching the vacuum pump attached to the end of said pipes, such condensing water with its heat going mostly to waste.

With the fixed opening valve on the return end of radiators it becomes an important condition of proper operation that a uniform degree of vacuum shall be maintained in return piping, the permanently open passages 35 being adjusted to correspond, as without such constant degree of vacuum the valve openings would require readjustment to correspond with changes of vacuum and prevent excessive withdrawal of steam by reason of too much opening, or insufficient withdrawal through too little opening; hence automatic governor 4, which may be of the diaphragm type shown in detail in Fig. 8 or of any other suitable type, is adjusted to supply motive steam to exhauster 5 in such measure as to keep the vacuum tension nearly constant, the governor pipe 4ᵃ transmitting said tension in return pipe 12 to the diaphragm 4ᵇ of the governor, which is attached to the steam supply valve 4ᶜ in usual manner.

A condition of successful operation of the heating system is protection of the valve openings 35 (Fig. 2) against being clogged with pipe scale, core sand, rust, grease and dirt, which are always present in a heating circuit. Such protection is furnished by the wire screen 38 (Fig. 3) carried on a frame 39 which is attached to cover 40 (Fig. 2) of valve case 41, and forms a chamber inclosing valve stems 36 and 37, into which inclosure all water entering the valve case through radiator connection 41ᵃ must flow, and from which it finds exit through discharge connection 42 to return pipe 12.

The reason for locating the secondary radiator between the receiver and primary radiators, as shown in my Patent Number 874,113, was to have the strongest pull of the vacuum at the point of final delivery of both air and water. While this arrangement is entirely satisfactory in most installations, it has been found that in case of large heating systems where the secondary radiator is at considerable distance from the receiver and exhauster, the height of water in the receiver fluctuates with the degree of vacuum, being greatest with highest vacuum, and that a U trap of more or less depth must be placed in the water drain pipe from the separator to the receiver to prevent steam from being drawn from the former to the latter. In such cases the location of the secondary radiator between the receiver and the exhauster insures steady water level in the receiver practically unaffected by the degree of vacuum carried in the return pipes of the heating system, as cause of variation in the other case is due to friction of air and vapor in contact with piping located between the separator and the exhauster which thus determines a less degree of vacuum at the receiver than at the separator.

In Fig. 7, which shows a suitable adaptation of my vacuum system to house heating, a low pressure boiler 1ª, typical of any suitable form of steam generator, supplies steam of usually one half pound to two and a half pounds pressure through valved steam supply pipe 19ª and branch pipe 20 to more or less radiation, represented by radiator 26, the water of condensation from which flows by gravity through pipe 12, having a check-valve 12ᵇ, opening toward the boiler, to the boiler. A pipe 16ª connected into the upper end of pipe 12 conveys air and vapor discharged from the fixed opening valve 29 on the return end of radiator 26, and from any other radiators in the heating circuit, to secondary radiator 15, which is designed to be of sufficient size to condense all steam entering it. The return pipe 14 enters separator 7, whence water flows through pipe 17 to the boiler, as conveniently shown through the lower end of pipe 12, while all air and vapor are drawn by exhauster 5 through pipe 6 and discharged from the exhauster—which is supplied with operative steam through pipe 2—through condensing coil 9 and pipe 10, having an outwardly opening check-valve 10ª, to the atmosphere. Water of condensation returns by gravity through pipe 12ª having check-valve 12ᶜ, opening with the return flow, to the boiler. The boiler is preferably equipped with the common arrangement of a diaphragm motor 21ª having a valved connection to the valved steam pipe 19ª for controlling draft of the boiler by a chain attached to the lever of the diaphragm and to both the ash-pit door and the coal supply door, thus governing steam pressure in the boiler in customary manner. So long as steam pressure in the boiler exceeds atmospheric pressure the exhauster will create circulation of steam through such radiators as have the supply valves more or less open and when vapor tension in the boiler falls below atmospheric pressure outwardly opening check-valve 10ª will close against entrance of outside air; thereafter condensation of steam in radiators through creation of some degree of vacuum will for some time continue to draw vapor from the boiler and so keep radiators heated to a limited extent.

I do not confine myself to the exact constructions and arrangements of apparatus shown, as various modifications can be made without departing from the essence of my improvements.

The term "radiator", as used in the claims, and in the specification, is intended to include all forms of cast iron and pressed metal radiators and pipe coils, thus corresponding to the term "radiation" as generally employed by heating engineers and the heating trade.

What I claim as my invention and desire to secure by Letters Patent is:—

1. In a steam heating system, the combination of a heating circuit embracing a supply pipe, a radiator and a return pipe; a secondary radiator so connected with the primary radiator as to receive only air and steam therefrom and adapted for condensing said steam; a closed air and water separating chamber in the return pipe from the secondary radiator; an air exhauster beyond the secondary radiator and its separating chamber for drawing steam and air from return piping of the heating system; a pipe establishing communication between the suction connection of the exhauster and the air space of the separating chamber; a discharge pipe from the exhauster adapted for discharging air uninterruptedly to the atmosphere; means for preventing return of air through said discharge pipe when some degree of vacuum exists therein; and means for operating the exhauster and for automatically draining water of condensation from the primary radiator and from the secondary radiator and returning it by gravity to a boiler, substantially as set forth.

2. In a steam heating system, the combination of a heating circuit including a supply pipe, a radiator and a return pipe; a secondary radiator so communicating with the primary radiator as to receive only air and steam therefrom, and adapted for condensing said steam; a closed air and water separating chamber in the return pipe from the secondary radiator; a water drainage pipe adapted to drain by gravity water of condensation from the separating chamber; an air exhauster beyond the secondary radiator and its separating chamber for drawing steam and air from return piping of the heating system; a pipe establishing communication from the suction connection of the exhauster into the air space of the separating chamber; a discharge pipe from the exhauster for discharging air uninterruptedly to the atmosphere; means for preventing reentrance of air through said discharge pipe when partial vacuum exists therein; and means for operating the exhauster and for automatically draining water of condensation from the primary radiator and from the secondary radiator and returning it by gravity to a boiler, substantially as shown and described.

3. In a steam heating system and in combination, a steam supply connected into a radiator; a water and air drainage pipe from the radiator; a secondary radiator in communication with the return from the primary radiator in such manner as to receive only air and steam from the primary radiator; a return pipe from the secondary radiator; a closed air and water separating chamber in said return pipe; an air exhauster having its suction in communication with the air space of the separating chamber; a discharge pipe from the exhauster adapted to discharge air uninterruptedly to the atmosphere and embracing an air-cooled condenser; means for preventing return of air through said discharge pipe when some degree of vacuum exists in said condenser; and means for operating the exhauster and for automatically draining water of condensation from the primary radiator, the secondary radiator and the air-cooled condenser.

4. In a steam heating system and in combination, a heating circuit embracing a supply pipe, a radiator and a return pipe; a closed air and water receiver connected into the return pipe at the return end of the system adapted for receiving the water of condensation from the heating system; a pump having its suction in communication with the water space of said receiver and adapted for automatically maintaining desired water level therein and for delivering where desired the water of condensation from the heating system; means for operating said pump; a secondary radiator beyond the receiver and in communication with the air space of the receiver; a return pipe from the secondary radiator; a water and air separating chamber in said return pipe; an exhauster having its suction so connected with said separating chamber as to draw only air and steam therefrom; a discharge pipe from the exhauster providing constant discharge to the atmosphere; and means for operating the exhauster and for automatically draining the secondary radiator, substantially as shown and described.

5. In a steam heating system and in combination, a heating circuit embracing a supply pipe, a radiator and a return pipe; a closed air and water receiver connected into the return pipe at the return end of the heating system and adapted to receive water of condensation from said system; a pump having its suction in communication with the water space of the receiver and adapted for automatically maintaining a desired water level therein and for delivering where desired water of condensation from the heating circuit; means for operating said pump; a secondary radiator beyond said receiver and in communication with the air space of said receiver; a return pipe from the secondary radiator; a water and air separating chamber in said return pipe; an air exhauster having its suction so connected with said separating chamber as to draw only air and vapor therefrom and adapted for maintaining a desired degree of vacuum in return piping of the heating system; means for automatically governing action of the exhauster by the degree of vacuum in return piping of the heating system; a discharge pipe from the exhauster to the atmosphere; and means for operating the exhauster and for automatically draining the secondary radiator, substantially as set forth.

CASSIUS CARROLL PECK.

Witnesses:
ARTHUR S. LIGHT,
WILLIAM F. MURRAY.